United States Patent
Oliver et al.

(10) Patent No.: US 8,903,862 B2
(45) Date of Patent: *Dec. 2, 2014

(54) APPARATUS, METHOD AND COMPUTER PROGRAM PRODUCT FOR PROCESSING RESOURCE DESCRIPTION FRAMEWORK STATEMENTS

(75) Inventors: Ian Oliver, Soderkulla (FI); Jukka Honkola, Espoo (FI); Ora Lassila, Hollis, NH (US)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/480,832

(22) Filed: May 25, 2012

(65) Prior Publication Data

US 2012/0303678 A1    Nov. 29, 2012

Related U.S. Application Data

(63) Continuation of application No. 12/126,402, filed on May 23, 2008, now Pat. No. 8,190,643.

(51) Int. Cl.
*G06F 7/00*  (2006.01)
*G06F 17/30*  (2006.01)
*G06F 17/22*  (2006.01)
*G06F 17/27*  (2006.01)

(52) U.S. Cl.
CPC ...... *G06F 17/30731* (2013.01); *G06F 17/2785* (2013.01); *G06F 17/30734* (2013.01)
USPC ........... 707/791; 707/803; 707/809; 715/234; 717/112

(58) Field of Classification Search
USPC .......... 707/794, 795, 803, 808–810; 715/205, 715/234, 239, 249, 255; 717/112, 141, 144
See application file for complete search history.

(56) References Cited

U.S. PATENT DOCUMENTS

| | | | |
|---|---|---|---|
| 2004/0054690 A1 | 3/2004 | Hillerbrand et al. | |
| 2006/0074980 A1* | 4/2006 | Sarkar | 707/104.1 |
| 2008/0109420 A1* | 5/2008 | Britton et al. | 707/4 |
| 2010/0030725 A1* | 2/2010 | Mendis et al. | 707/1 |
| 2010/0227625 A1* | 9/2010 | Rehkopf | 455/456.1 |

* cited by examiner

*Primary Examiner* — Augustine K Obisesan
*Assistant Examiner* — Berhanu Mitiku
(74) *Attorney, Agent, or Firm* — Alston & Bird LLP

(57) ABSTRACT

A method is provided that includes receiving a first triple including a subject, predicate and object, where the object is of a literal-type. For the first triple, then, the method includes identifying a subtype of the object; semantically marking the object with the identified subtype, including generating second and third triples; and storing the second and third triples in a triple store. In this regard, the second triple includes the subject and predicate of the first RDF triple as the subject and predicate thereof, and the third RDF triple includes the object of the first RDF triple or a representation of the object of the first RDF triple as the object thereof.

18 Claims, 10 Drawing Sheets

APPARATUS, METHOD AND COMPUTER PROGRAM PRODUCT FOR PROCESSING RESOURCE DESCRIPTION FRAMEWORK STATEMENTS

FIELD OF THE INVENTION

Embodiments of the present invention generally relate to systems and methods of representing data and, more particularly, relate to systems and methods of processing Resource Description Framework (RDF) statements for storage thereof.

BACKGROUND OF THE INVENTION

The World Wide Web has developed primarily as medium of content for human consumption. Automating tasks on the Web (such as information retrieval, synthesis of information, etc.) is difficult because human interpretation is often required to make information content useful. Offering relief, a new architecture for the Web is emerging, known as the "Semantic Web." In broad terms, the Semantic Web encompasses efforts to create mechanisms that augment content with formal semantics, thereby producing content suitable for automated systems (e.g., intelligent software agents) to consume. The Semantic Web permits more automated functions on the Web (e.g., reasoning, information and service discovery, service composition, etc.), easing the workload of its users.

The Semantic Web will also pave the way for true "device independence" and customization of information content for individual users. Information on the Web can now exist in a "raw form" and any context-dependent presentation can be rendered on demand (more generally, the Semantic Web represents a departure from the current "rendering-oriented" Web). It is important to note that the Semantic Web is not a separate Web but an extension of the current one in which information, when given this well-defined meaning, better enables computers and people to work in tandem.

In the Semantic Web, content and services can be described using representation languages such as RDF (Resource Description Framework) and OWL (Ontology Web Language). In this regard, representations often refer to ontologies or specifications of conceptualizations that, in turn, enable reasoning via the use of logic rules. More particularly, ontologies may define domains by specifying, for example, concepts (i.e., classes), relationships between concepts, properties of concepts (i.e., slots), restrictions on properties (i.e., facets), individuals (i.e., instances), or the like. Ontologies may include, for example, personal information management (PIM) ontologies, location ontologies, temporal ontologies, friend-of-a-friend (FOAF) ontologies, composite capability/ preference profiles (CC/PP) schema, Web service ontologies (e.g., OWL-S, Web Service Modeling Ontology—WSMO), policy ontologies, and the like. For more information on the Semantic Web, see Berners-Lee, Hendler, and Lassila, *The Semantic Web*, SCIENTIFIC AMERICAN, 284(5):3443, May 2001.

The application of Semantic Web technologies to Web services may be referred to as Semantic Web services whereby descriptions of service interfaces are associated with formal semantics, allowing software agents to describe their functionality, discover and "understand" other agents' functionality and invoke services provided by other agents. Furthermore, it may be possible to combine multiple services into new services. Work on Semantic Web services is at least partially driven by the possibility to automate things that formerly have required human involvement, consequently leading to improved interoperability.

As known to those skilled in the art, RDF and OWL are two key Semantic web standards. These standards make machine consumption easy by use of Uniform Resource Identifiers (URIs) to uniquely identify resources. Moreover, both of these standards provide a common data model and a machine processable language to exchange information. For instance, both OWL and RDF use the RDF data model and both use Extensible Markup Language (XML)-based syntax (RDF/ XML) machine processable language to exchange information. Additionally, RDF and OWL maintain a common vocabulary with unambiguous formal semantics. To be precise, RDF may utilize RDF Schema (RDFS) as a language for describing vocabularies in RDF. Similarly, OWL which is also a vocabulary language extension of RDF and RDFS may utilize constructs defined by RDF and RDFS.

Data models that use RDF or OWL enable applications to integrate data created by heterogeneous sources and allow derivation of implicit relationships between resources (as referred to in the art as "inferencing," which typically refers to the process of applying rules that describe what can be derived and the conditions under which such derivations are undertaken. Both RDF and OWL have an associated set of rules that allow implicit relationships between resources to be derived. For example, a resource named "Felix" is of type "Cat," and "Cat" is a subclass of "Mammal." By virtue of RDF's standard inference rules the information that "Felix" is also of type "Mammal" can be derived.

RDF is a language for representing information about resources on the Web. It is particularly intended for representing metadata about Web resources, such as the title, author, and modification date of a Web page, as well as copyright and licensing information about a Web document, or the availability schedule for a shared resource. However, by generalizing the notion of a Web resource, RDF can additionally be used to represent information about things or objects that can be identified on the Web, even when the things or objects cannot be directly retrieved via the Web. Some examples include, but are not limited to, information concerning availability of items from on-line shopping store (e.g., information about specifications, prices, availability, etc.), or the description of a Web user's preferences regarding information that he/she may want delivered to them.

RDF is premised on the notion of identifying things (i.e., objects) using Web identifiers such as URIs and describing resources in terms of simple properties and property values. As shown in FIG. 1, the use of URIs enables RDF to represent simple statements, concerning resources, as a network (also known as a "graph") of nodes and arcs representing the resources, as well as their respective properties and values. As shown, the graph includes nodes that represent various Web resources, and arcs that represent the properties of the resources or relationships between the resources. A combination of two arc endpoints and the arc connecting them, in RDF parlance, is called a "statement," and it asserts some fact about the resource involved (statements are also called "triples"). For a more particular example, consider a RDF graph and corresponding XML-based syntax provided in FIG. 2, and Table 1 below, this example previously appearing in the W3C RDF Primer (2004).

TABLE 1

Example: RDF/XML Describing Eric Miller

```
<?xml version="1.0"?>
<rdf:RDF xmlns:rdf="http://www.w3.org/1999/02/22-rdf-syntax-ns#"
        xmlns:contact=
            "http://www.w3.org/2000/10/swap/pim/contact#">
    <contact:Person rdf:about=
    "http://www.w3.org/People/EM/contact#me">
        <contact:fullName>Eric Miller</contact:fullName>
        <contact:mailbox rdf:resource="mailto:em@w3.org"/>
        <contact:personalTitle>Dr.</contact:personalTitle>
    </contact:Person>
</rdf:RDF>
```

As shown, an RDF statement may include a subject, an object, and a predicate (or property) that denotes a relationship between a particular subject and an object (the aforementioned triple referring to the subject, predicate and object—(s, p, o)). The nodes of the RDF graph represent the subject and object (the respective nodes simply being referred to as the subject and object), and the arc represents the relationship (the arc simply being referred to as the predicate or property). The subject and predicate of a RDF statement may comprise URI references (sometimes simply referred to as a URI), and the object may comprise a URI reference or a literal. In this regard, a literal may be used to identify a value (e.g., number, date, etc.) by means of a lexical representation (e.g., string).

A data store configured to store RDF content is typically referred to as an RDF store or a triple store. Storage of information in an RDF store is currently limited to two distinct object types, namely URI and literal. One can store binary data in an RDF store, but as the size of the binary data increases, storing of binary data may become inefficient, both from a storage standpoint and a querying of content standpoint. In the case of a music file, for example, the size of the music file may be many times larger than the rest of the RDF information representing it. This drawback may be further exacerbated in resource-limited devices including an RDF store, where large binary data may exceed the memory capabilities of the device.

SUMMARY OF THE INVENTION

In view of the foregoing background, exemplary embodiments of the present invention therefore provide an architecture for efficiently handling various RDF objects in an RDF store through automatic, semantic marking and, if so desired, processing (e.g., compressing, reformatting, encrypting, archiving) of those objects into a format more reasonably or efficiently stored, one or both of which may be performed in a manner transparent to the user. Exemplary embodiments of the present invention may be configured to process any type of RDF object of any size, but may have particular application in various instances to larger objects, sometimes referred to as binary large objects (blobs), which may include text, images, audio or other media content.

According to one aspect of the present invention, a method is provided that includes receiving a first triple (e.g., resource description format—RDF triple) including a subject, predicate and object, where the object is of a literal-type. The method also includes identifying a subtype of the object; semantically marking the object with the identified subtype, including generating second and third triples; and storing the second and third triples in a triple store, where the second and third triples may be stored in lieu of the first triple. In this regard, the second triple includes the subject and predicate of the first triple as the subject and predicate thereof, and the third triple includes the object of the first triple or a representation of the object of the first triple as the object thereof.

In addition to identifying the subtype, one or more other properties may be identified. And in such instances, the object may be further semantically marked with the identified one or more other properties. Semantically marking the object may then further include generating, for each of the identified one or more other properties, an additional triple including the respective other property as the object thereof.

In addition to semantically marking the literal-type object of the first triple, the method may also include processing the object of the first triple. This processing may include one or more of compressing, reformatting or encrypting the object, the representation of the object in such instances comprising the processed object or a representation thereof. Additionally or alternatively, this processing may include archiving the object or processed object at a location in storage external to the store, where the representation of the processed object or object may include the storage location.

According to other aspects of the present invention, an apparatus and computer-readable storage medium are provided. As indicated above and explained below, the apparatus, method and computer-readable storage medium of exemplary embodiments of the present invention may solve the problems identified by prior techniques and/or provide additional advantages.

BRIEF DESCRIPTION OF THE DRAWINGS

Figure 1:
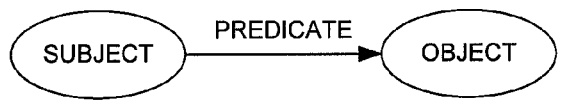
Figure 2:
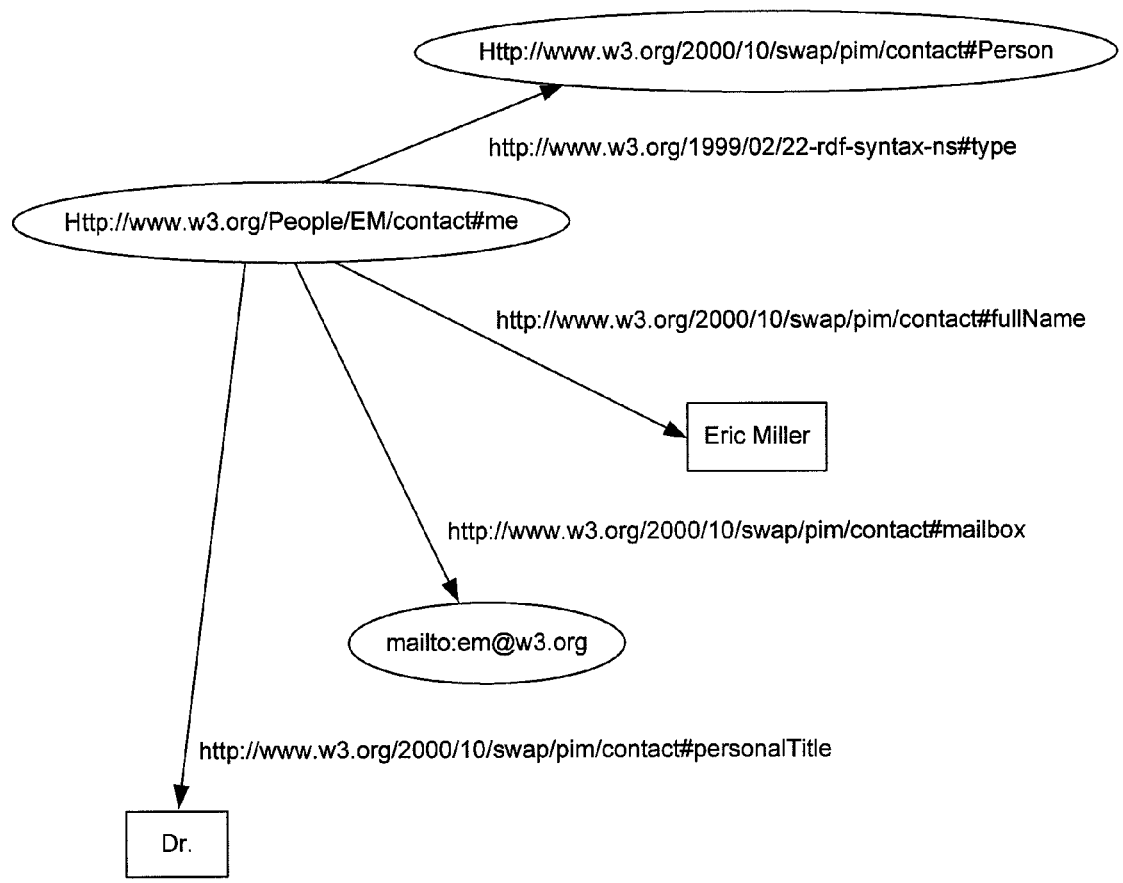
Figure 3:
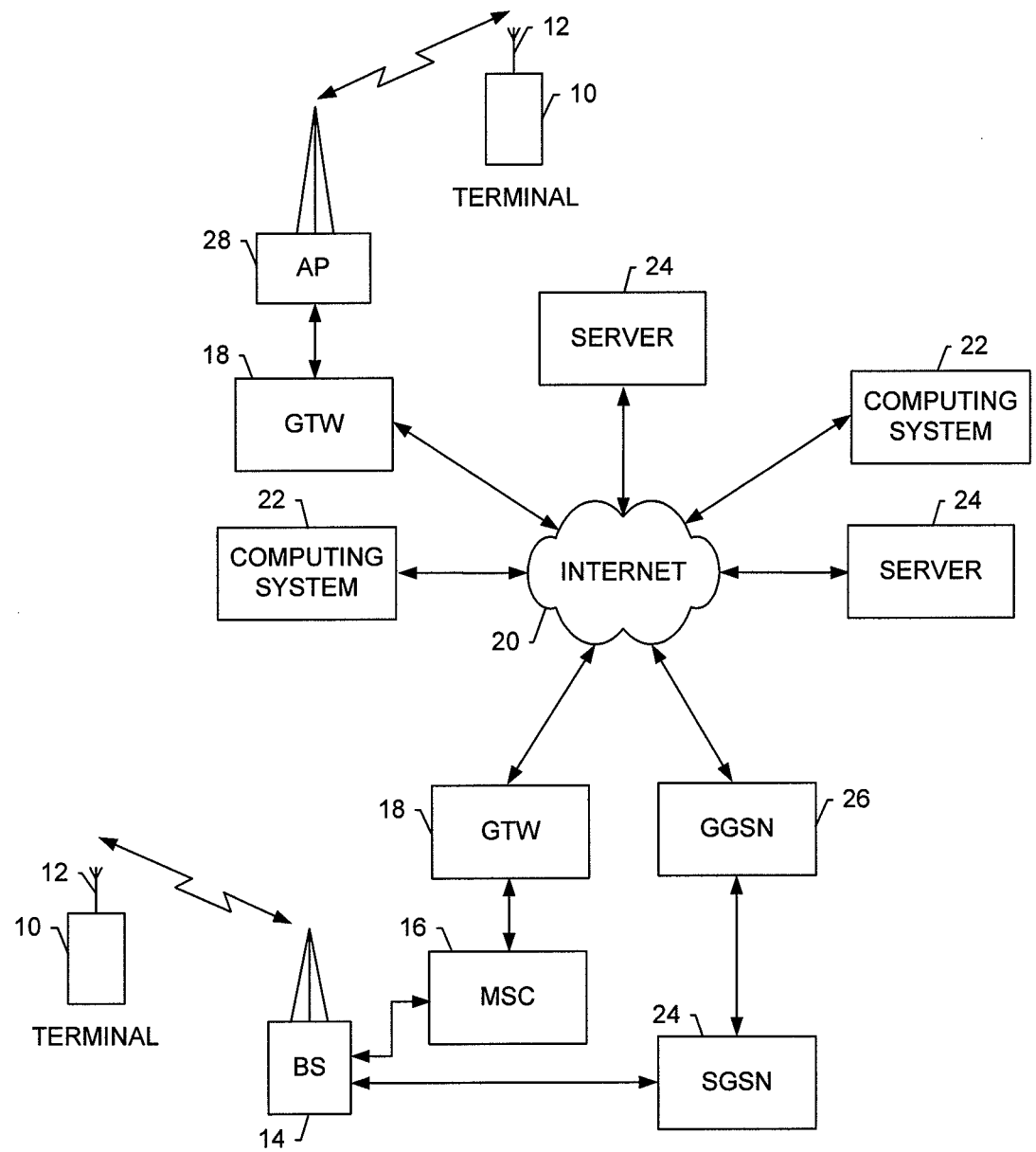
Figure 4:
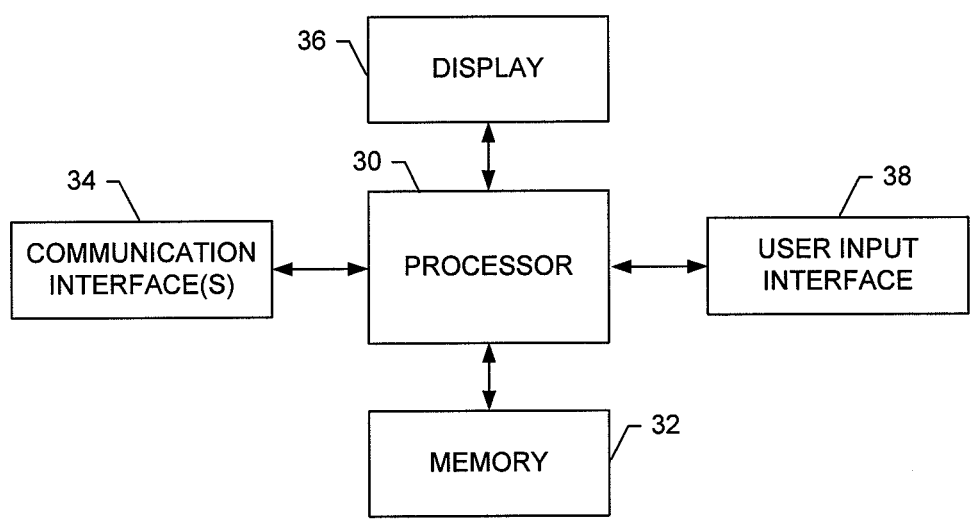
Figure 5:
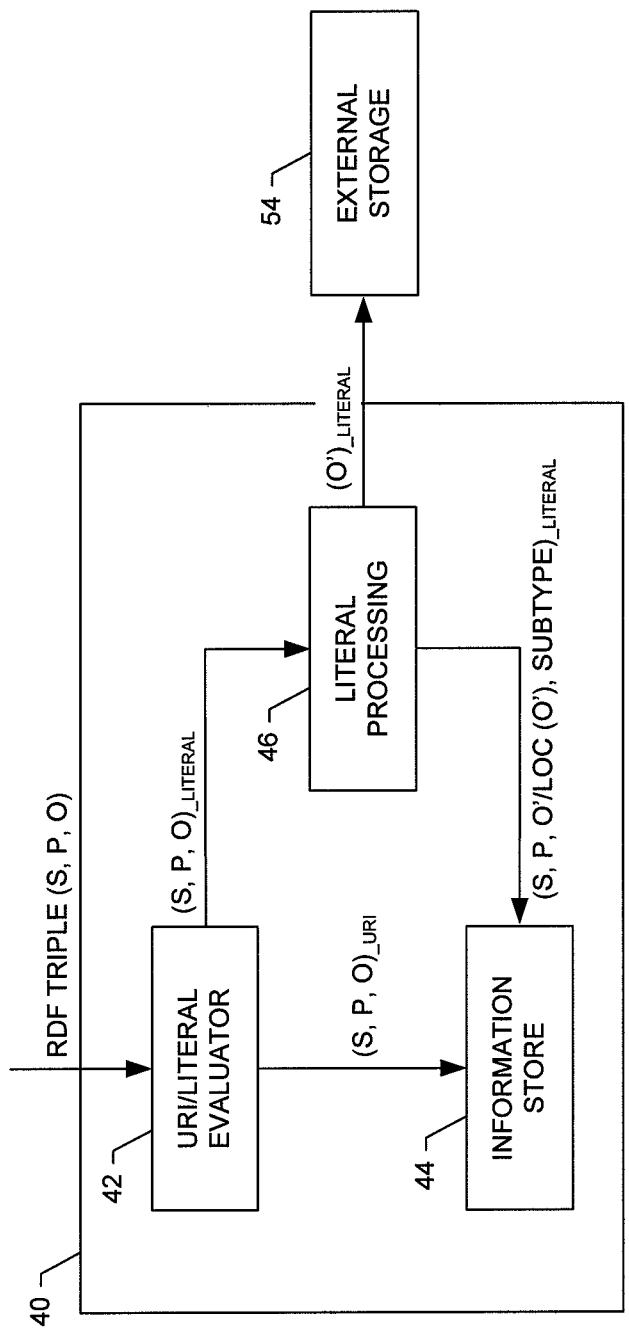
Figure 6:
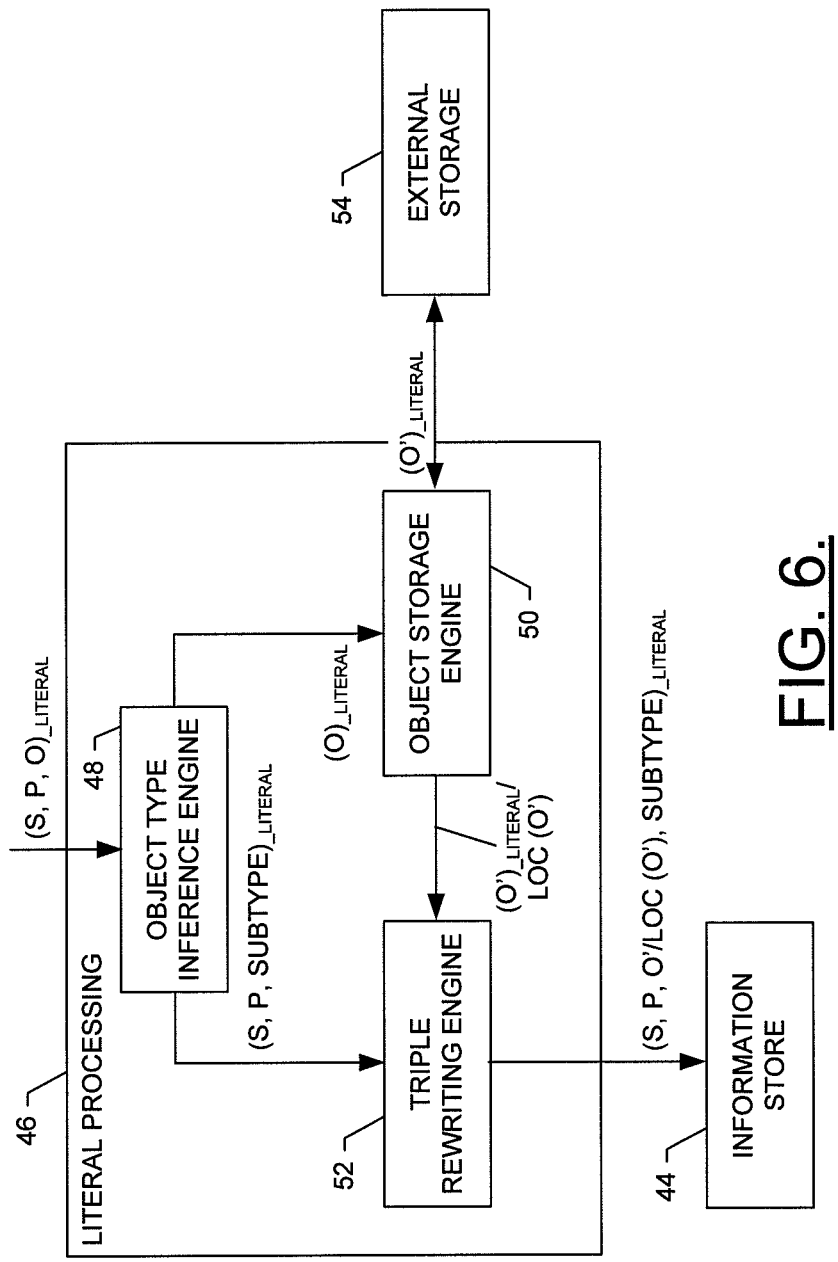
Figure 7:
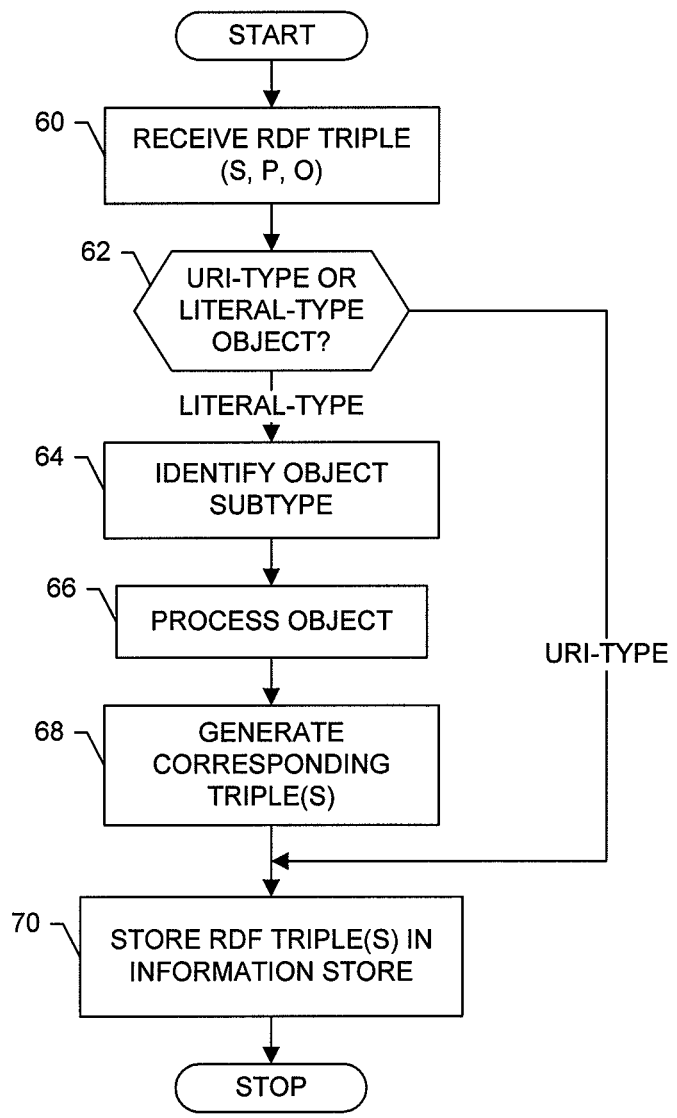
Figure 8:
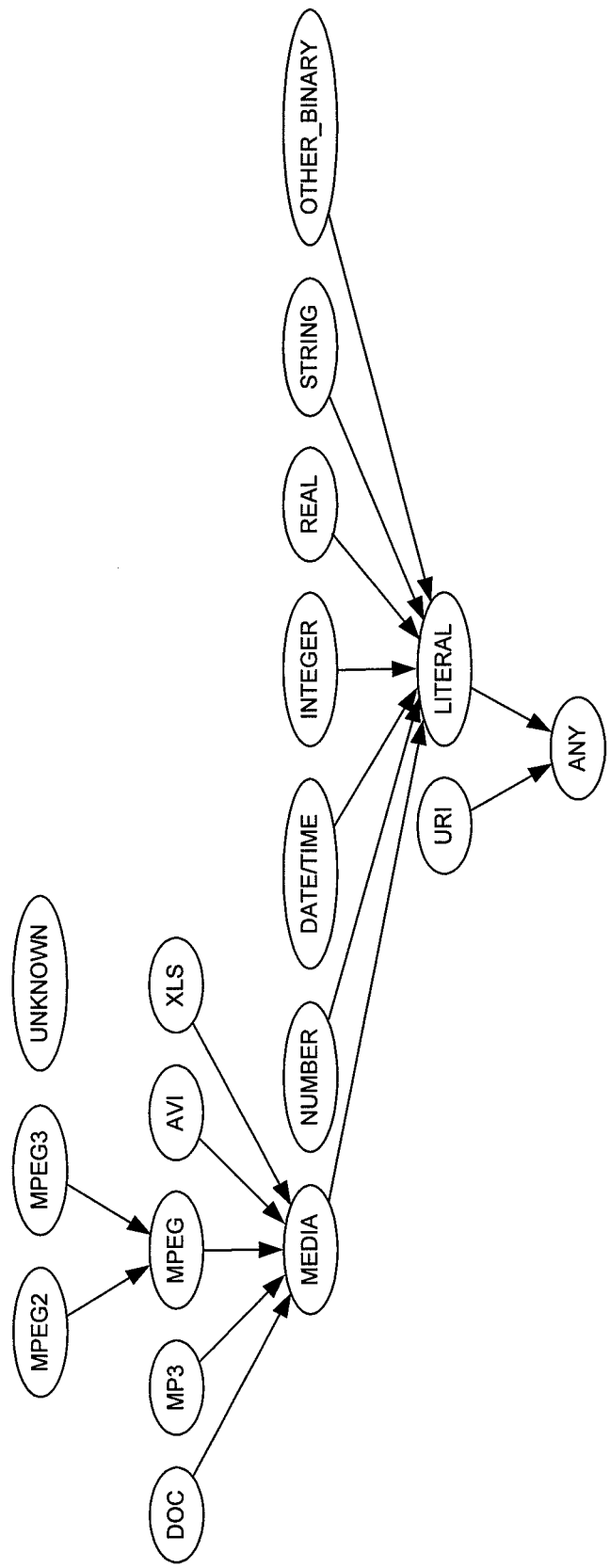
Figure 9:
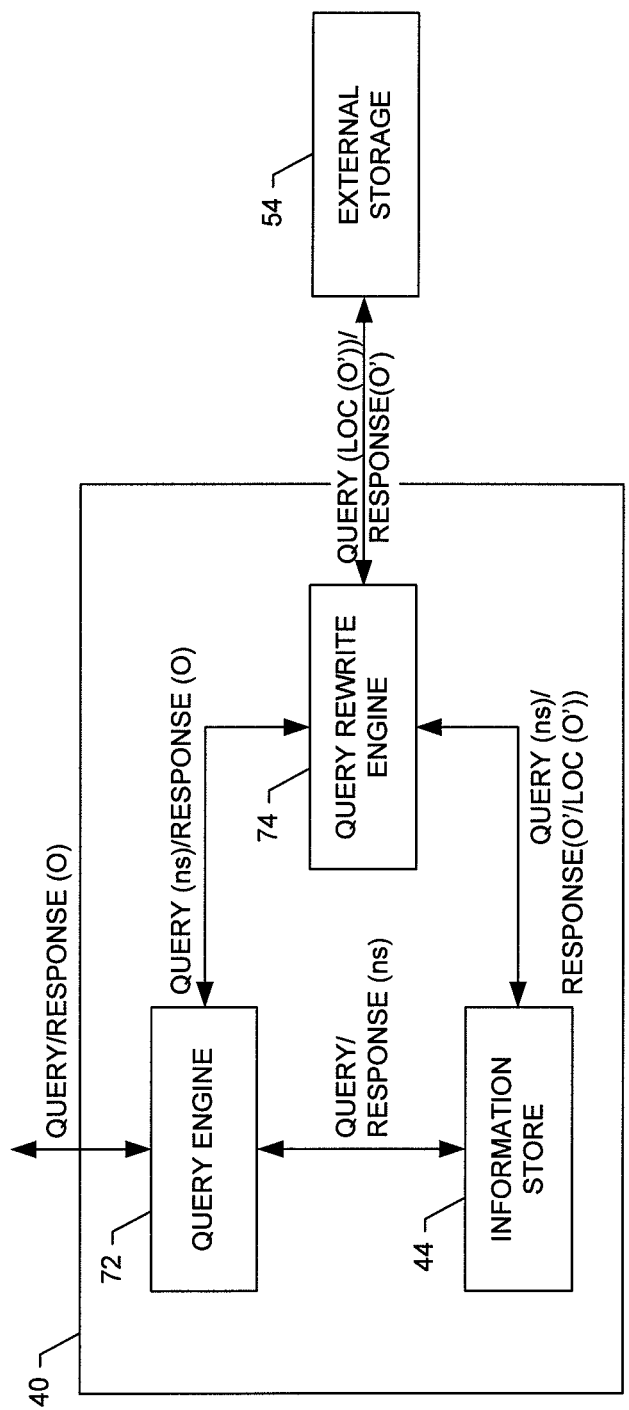
Figure 10:
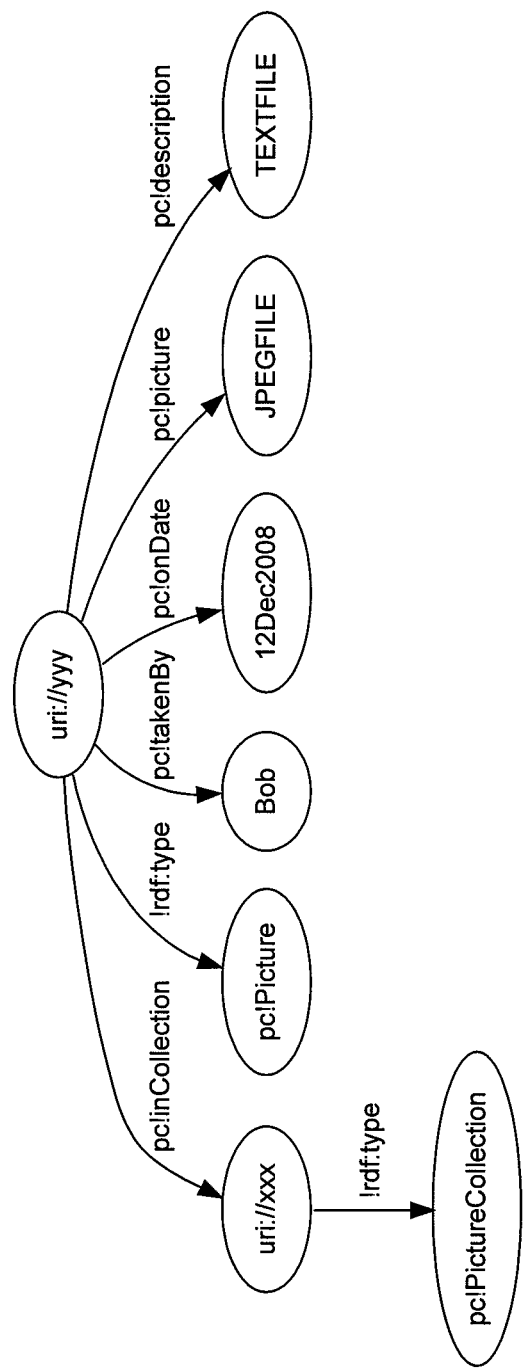
Figure 11:
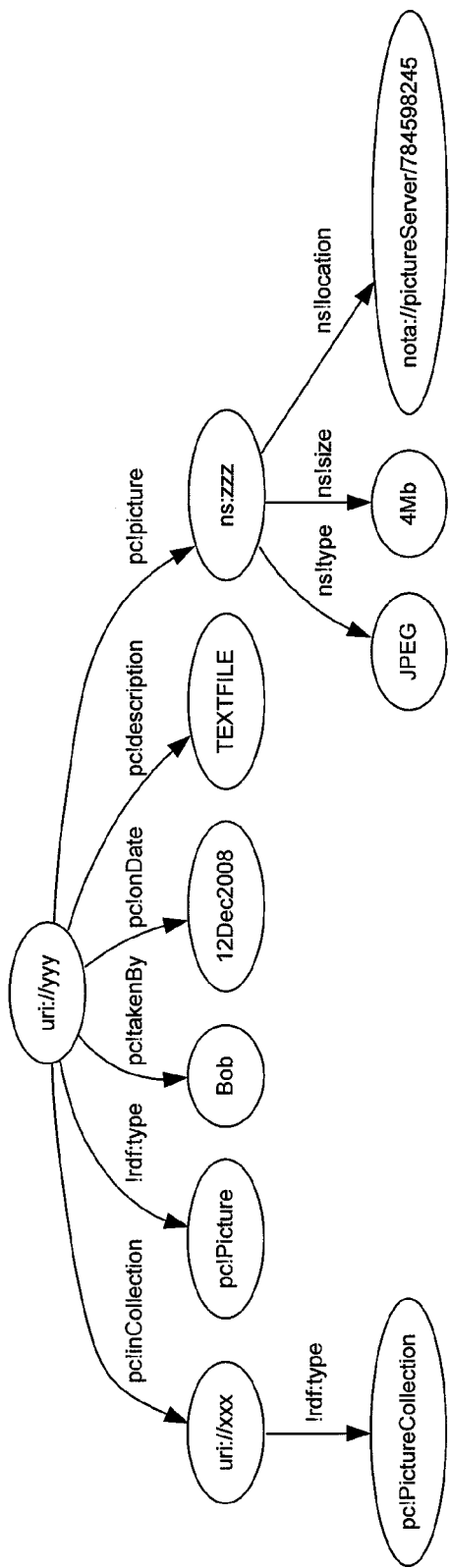
Figure 12:
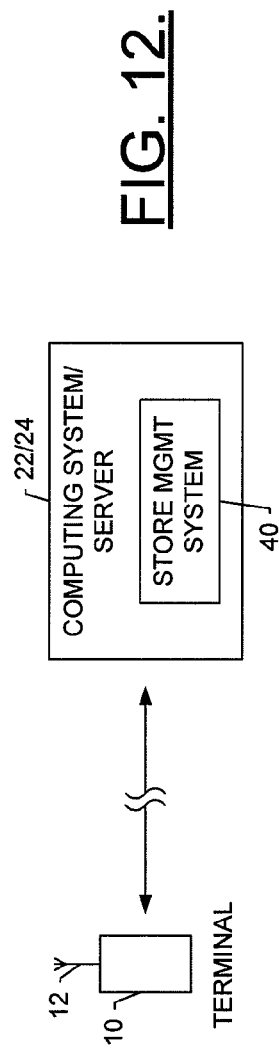

Having thus described the invention in general terms, reference will now be made to the accompanying drawings, which are not necessarily drawn to scale, and wherein:

FIG. 1 is a block diagram of an exemplary RDF graph;

FIG. 2 is a block diagram of a more particular exemplary RDF showing a a group of statements pertaining to attributes of a person;

FIG. 3 is a block diagram of one type of terminal and system that may benefit from exemplary embodiments of the present invention;

FIG. 4 is a schematic block diagram of an entity capable of operating as a terminal, computing system and/or server, in accordance with exemplary embodiments of the present invention;

FIGS. 5, 6 and 9 are functional block diagrams of an RDF store management system, according to exemplary embodiments of the present invention;

FIG. 7 is a flowchart including various steps in a method of processing an RDF triple, according to exemplary embodiments of the present invention;

FIG. 8 is a graph of a hierarchy of object types for a RDF triple, according to exemplary embodiments of the present invention;

FIGS. 10 and 11 are graphs of exemplary RDF triples before and after processing of one of those triples, respectively, according to exemplary embodiments of the present invention; and FIG. 12 is a functional block diagram of a computing system or server interacting with a terminal to carry out one or more functions according to exemplary embodiments of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 3, an illustration of one type of terminal and system that would benefit from exemplary embodiments of the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, one or more terminals 10 may each include an antenna 12 for transmitting signals to and for receiving signals from a base site or base station (BS) 14. The base station is a part of one or more cellular or mobile networks each of which includes elements required to operate the network, such as a mobile switching center (MSC) 16. As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 18, and the GTW is coupled to a WAN, such as the Internet 20. In turn, devices such as processing devices (e.g., personal computers, laptop computers, server computers or the like) can be coupled to the terminal 10 via the Internet. For example, the processing devices can include one or more processing devices associated with a computing system 22 (personal computer, laptop computer, etc.), server 24 (two of each being shown in FIG. 3) or the like.

The BS 14 can also be coupled to a signaling GPRS (General Packet Radio Service) support node (SGSN) 24. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network. The packet-switched core network is then coupled to another GTW, such as a GTW GPRS support node (GGSN) 26, and the GGSN is coupled to the Internet. In addition to the GGSN, the packet-switched core network can also be coupled to a GTW 18. Also, the GGSN can be coupled to a messaging center. In this regard, the GGSN and the SGSN, like the MSC, can be capable of controlling the forwarding of messages, such as MMS messages. The GGSN and SGSN can also be capable of controlling the forwarding of messages for the terminal to and from the messaging center.

In addition, by coupling the SGSN 24 to the GPRS core network and the GGSN 26, devices such as a computing system 22 and/or server 24 can be coupled to the terminal 10 via the Internet 20, SGSN and GGSN. In this regard, devices such as a computing system and/or server can communicate with the terminal across the SGSN, GPRS and GGSN. By directly or indirectly connecting the terminals and the other devices (e.g., computing system, origin server, etc.) to the Internet, the terminals can communicate with the other devices and with one another to thereby carry out various functions of the terminal and/or one or more of the other devices.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The terminal 10 can further be coupled to one or more wireless access points (APs) 28. The APs can comprise access points configured to communicate with the terminal in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs may be coupled to the Internet 20. Like with the MSC 16, the APs can be directly coupled to the Internet. In one embodiment, however, the APs are indirectly coupled to the Internet via a GTW 18. As will be appreciated, by directly or indirectly connecting the terminals and the computing system 22, server 24, and/or any of a number of other devices, to the Internet, the terminals can communicate with one another, the computing system, etc., to thereby carry out various functions of the terminal, such as to transmit data, content or the like to, and/or receive content, data or the like from, the computing system. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 3, in addition to or in lieu of coupling the terminal 10 to computing systems 22 and/or servers 24 across the Internet 20, the terminal and one or more computing systems and/or servers can be coupled to one another and communicate in accordance with, for example, RF, BT, IrDA or any of a number of different wireline or wireless communication techniques, including LAN, WLAN, WiMAX and/or UWB techniques. One or more of the computing systems can additionally, or alternatively, include a removable memory capable of storing content, which can thereafter be transferred to the terminal. Further, the terminal 10 can be coupled to one or more electronic devices, such as printers, digital projectors and/or other multimedia capturing, producing and/or storing devices (e.g., other terminals). Like with the computing systems and/or servers, the terminal can be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Referring now to FIG. 4, a block diagram of an entity capable of operating as a terminal 10, computing system 22 and/or server 24, is shown in accordance with one embodiment of the present invention. Although shown as separate entities, in some embodiments, one or more entities may support one or more of a terminal, computing system and/or server, logically separated but co-located within the entit(ies). For example, a single entity may support a logically separate, but co-located terminal and computing system. Also, for example, a single entity may support a logically separate, but co-located computing system and server.

The entity capable of operating as a terminal 10, computing system 22 and/or server 24 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 4, the entity can include a processor 30 connected to a memory 32. The processor may be embodied in a number of different ways. For example, the processor may be embodied as a CPU (central processing unit), microprocessor, coprocessor, controller and/or various other processing devices including integrated circuits such as an ASIC (application specific integrated circuit), FPGA (field programmable gate array) or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

As described herein, the client application(s) may each comprise software operated by the respective entities. It should be understood, however, that any one or more of the client applications described herein can alternatively comprise firmware or hardware, without departing from the spirit and scope of the present invention. Generally, then, the terminal 10, computing system 22 and/or server 24 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (i.e., terminal, computing system, server, etc.) or more particularly, for example, a processor 30 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 32, the processor 30 can also be connected to at least one interface or other means for displaying, transmitting and/or receiving data, content or the like. In this regard, the interface(s) can include at least one communication interface 34 or other means for transmitting and/or receiving data, content or the like. For example, the communication interface(s) can include a first communication interface for connecting to a first network, and a second communication interface for connecting to a second network. In addition to the communication interface(s), the interface(s) can also include at least one user interface that can include one or more earphones and/or speakers, a display 36, and/or a user input interface 38. The user input interface, in turn, can comprise any of a number of devices allowing the entity to receive data from a user, such as a microphone, a keypad, a touch display, a joystick, image capture device (e.g., digital camera) or other input device.

As explained in the background section, in the Semantic Web, content and services can be described using representation languages including RDF (Resource Description Framework) in which information may be represented by an RDF statement including a subject, an object, and a predicate (or property) that denotes a relationship between a particular subject and an object. As also explained, an RDF store (or triple store) configured to store RDF content is currently limited to two distinct types of objects, namely a URI and literal. And although these types of objects may be stored in an RDF store, their storage becomes less efficient as the size of those objects increases.

Exemplary embodiments of the present invention therefore provide an architecture for efficiently handling various RDF objects in an RDF store through automatic, semantic marking and, if so desired, processing (e.g., compressing, reformatting, encrypting, archiving) of those objects, which may be performed in a manner transparent to the user. Exemplary embodiments of the present invention may be configured to process any type of RDF object of any size, but may have particular application in various instances to larger objects, sometimes referred to as binary large objects (blobs), which may include text, images, audio or other media content.

Generally, exemplary embodiments of the present invention provide an apparatus, method and computer program product for processing an RDF triple (statement), or rather the object of an RDF triple, including receiving the statement and, if identified as including a literal-type object, automatically marking the object. Also if identified as being of a literal-type, the object may be processed, such as by compressing, formatting encrypting and/or archiving or otherwise storing the object outside the RDF store in an external storage local or remote from the apparatus. If so desired, the functions performed by the apparatus may be customized, such as on a per-RDF store basis, or even on a per-object-type basis. As explained above and herein, an RDF triple or statement may include a subject, an object and a predicate (or property). It should be understood, however, that an RDF triple or statement may include or otherwise form part of a data structure including one or more other pieces of data, if so desired.

Reference is now made to FIGS. 5, 6, 7 and 9, which illustrate functional block diagrams and a flowchart of exemplary embodiments of the present invention. As shown and described herein, exemplary embodiments of the present invention may be implemented by any of a number of different apparatuses, alone or in communication with any of a number of other apparatuses. As shown in FIGS. 1 and 2, for example, exemplary embodiments of the present invention may be implemented by any one or more of a terminal 10, computing system 22 or server 24, alone or in communication with one another. Similarly, exemplary embodiments of the present invention may be implemented in any of a number of different manners, including for example, in software, firmware and/or hardware (e.g., processor 30).

According to one exemplary embodiment of the present invention, an RDF store management system 40 (e.g., at a terminal 10, computing system 22 or server 24) is configured to receive an asserted RDF triple including a subject, predicate and object (s, p, o), and an inferred or explicitly-stated object type (explained below), as shown in block 60 of FIG. 7. The RDF store management system includes a URI/literal evaluator 42, information store (RDF store) 44, and literal processing element 46. As shown and described herein, the URI/literal evaluator and literal processing element may be implemented, for example, by a processor 30, alone and/or under control of computer-readable program code portions; and the information store may be implemented by a memory 32. The URI/literal evaluator is configured to pass triples with URIs as objects (URI-type objects) to the information store for storage therein, and divert triples with literals as objects (literal-type objects) to the literal processing element, as shown in blocks 62 (storage being shown at block 70). Generally, then, if an RDF triple includes a URI-type object, that triple may be stored in the information store "as is"; otherwise, if the RDF triple includes a literal-type object, the triple may be processed before being stored in the information store.

Turning now to FIG. 6, the literal processing element 46 of the RDF store management system 40 is generally configured to semantically mark literal-type objects, and/or process those objects into a format more reasonably or efficiently stored (in the RDF store 44 or external storage 54). The literal processing element may include an object type inference engine 48, object storage engine 50 and triple (statement) rewriting engine 52. The object type inference engine may be configured to receive the RDF triple with a literal-type object, and identify a subtype of the respective object for semantically marking the object and, if so desired (but otherwise not required), for processing that object, as shown in block 64 of FIG. 7. In this regard, the subtype of a literal-type object may refer to the type of lexical representation of the object, such as media, number, date/time, string, other binary or the like. Even further, depending on the desired granularity of the semantic marking, the object type inference engine may be configured to identify further refined subtypes of the respective object, such as by identifying a sub-subtype of the respective object. If so desired, this hierarchy may be extended to take into consideration existing standards such as the MIME (Multipurpose Internet Mail Extension) types or other common Internet typing mechanisms. For an example hierarchy of object types for a RDF triple, see FIG. 8.

The object type inference engine 48 may be configured to identify the subtype of a literal-type object in a number of different manners. For example, the object type inference engine may be configured to identify the subtype of a literal-type object according to a magic number (value used to identify a file format or protocol) embedded within the respective object. Additionally or alternatively, the subtype may be identified according to a pattern matching mechanism whereby a pattern of binary data of the object may be matched to a pattern associated with a particular subtype, where the object type inference engine may have or otherwise access a pre-stored library of data patterns and associated object subtypes.

In addition to a number of particular subtypes, the available subtypes with which a literal-type object may be marked may include one or more catch-all subtypes. More particularly, for example, the subtypes may include an "unknown" subtype to account for instances in which a particular subtype of a literal-type object is otherwise unidentifiable. Similarly, for example, the available subtypes may include an "any" subtype to account for instances in which a literal-type object may be identified as any particular subtype. In cases in which the subtype of a literal-type object may be narrowed to a smaller number of potential subtypes, however, the object type inference engine 48 may enable marking the object with that smaller number of subtypes, thereby allowing fallback mechanisms. In these instances, and more generally, the object type inference engine may also be configured to identify one or more other properties of the literal-type object, such as its size (e.g., bytes).

Regardless of exactly how the object type inference engine 48 identifies the subtype of a literal-type object of a RDF triple, the object type inference engine may pass the literal-type object and, if so desired, its identified subtype and/or other properties to the object storage engine 50. The object storage engine, in turn, may be configured to process the literal-type object, as shown in block 66. This processing may or may not be based on the identified subtype and/or other properties, and may include, for example, passing the object to storage 54 external to the RDF store 44 for storage thereat (archiving the object), where this storage may be local to or remote from the apparatus implementing the RDF store. An example of such an external storage may be that provided by Amazon's Simple Storage Service (S3). Additionally or alternatively, this processing may include compressing, reformatting and/or encrypting the object into a format more reasonably or efficiently stored (in the RDF store or external storage). The object storage engine may then pass a representation of the object, such as the processed object (o') or external storage location of the original or processed object (shown as loc(o')), to the triple rewriting engine 52. In another example, in the context of image objects, processing may include external storage of the image, and creation of a thumbnail of the image that may be passed to the triple rewriting engine.

In addition to receiving the processed object or external location thereof, the triple rewriting engine 52 may also receive the subject and predicate, and identified subtype and other properties (if not otherwise passed from the object storage engine), of the received RDF triple from the object type inference engine 48. The triple rewriting engine may then be configured to generate a plurality of RDF triples corresponding to the respective RDF triple, and including the subject, predicate, processed object (or external storage location), subtype and/or other properties of the respective RDF triple, thereby semantically marking the respective RDF triple, as shown in block 68. The corresponding RDF triple(s) may then be passed to the information store for storage therein, as shown in block 70.

The triple rewriting engine 52 may generate the corresponding RDF triples in any of a number of different manners, but in one exemplary embodiment, may generate a new URI with an internal designation (e.g., some internal namespace—ns—and unique identifier). In one exemplary embodiment, the new URL may be generated from a hash function of the original or processed literal-type object or another piece of information, where an RDF triple representing the hash function may be added to the information store 44. This new URL may serve as the object of an RDF triple including the original subject and predicate, and the subject of additional RDF triples the objects of which may be the identified subtype and other properties, as well as the processed object or its external storage location. In this regard, the predicates of these additional triples may be URIs including the internal namespace and identifiers of the types of respective objects in the respective internal namespace, such as in the case of the predicates "ns!type," "ns!size" and "ns!location" identifying the subtype, size and external storage location of the original literal-type object (or processed object as may be the case for the external storage location).

In addition to or in lieu of the aforementioned, the RDF store management system 40 may also be configured to receive and respond to queries for objects within the information store (RDF store) 44. In this regard, referring to FIG. 9, the RDF store management system may include a query engine 72 and query rewrite engine 74 configured to receive and process queries. Similar to other components of the RDF store management system, the query engine and query rewrite engine may be implemented, for example, by a processor 30, alone and/or under control of computer-readable program code portions. The query engine may be configured to receive a query for an RDF object (e.g., by WQL, Xpath, SparQL), where the query may include the subject and predicate of an RDF triple including the respective object, or may identify the object itself. In the case in which the query includes the subject and predicate of an RDF triple, the query engine may query the information store 44 based on that subject and predicate. In instances in which the object of the queried subject and predicate is a URI-type object, or the identified object itself is a URI-type object, the information store may return the respective object, which the query engine may return in response to the query.

In instances in which the object of a queried subject and predicate is a processed literal-type object, the information store 44 may return the URI with internal designation (e.g., ns and unique identifier) generated during semantic marking of the respective object. The query engine 72 may be configured to recognize the URI as having been generated for a processed literal-type object, and pass the URI to the query rewrite engine 74 in another query. The query rewrite engine may receive the query including the URI, and itself query the information store for triples including the respective URI as its subject. These triples, as indicated above, include the processed object or external storage location of the processed object (or original object). The information store may respond to the query with those triples. If the triples include the processed object, the query rewrite engine may retrieve the original object from the processed object and return it to the query engine. Otherwise, if the triples include the processed object's external storage location, the query rewrite engine may query the external storage 54 for the processed object at its respective location, and in response to receiving the processed object from the external storage, may retrieve the original object from the processed object (if processed) and return it to the query engine. The query engine may then return the original object in response to the query.

In other instances the query received by the query engine 72 may identify or otherwise include the literal-type object itself. In such instances, as the respective object may be stored in either the information store 44 or an external storage 54, the query engine may query the information store and query the query rewrite engine to, in turn, query the external storage, such as to identify a match (or substantial match) between the received object and an object in the information store or external storage. Also, as the object may be stored in its original or a processed (e.g., compressed, formatted, encrypted) form, the information store and/or external storage may be queried based on a processed form of the received object, where the received object may be processed by the query rewrite engine alone or in concert with the object storage engine 50 in the same manner that the respective object would be processed for storage in the information store or external storage. That is, the query engine may query the query rewrite engine to not only search the external storage for the received object, but to also process the received object and query the information store and external storage based on the received, processed object. On being returned to the query rewrite engine, the query rewrite engine may retrieve the original object from the processed object (if processed) and return it to the query engine, may then return the original object in response to the query.

As explained above in the context of a query including the literal-type object, the query engine 72 and/or query rewrite engine 74 may search for a match between the received object (received in the query) and a stored object (in the information store 44 or external storage 54). In lieu of this type of search, in instances in which the new URI generated during semantic marking of the object is generated from a hash function of the original or processed literal-type object, the query rewrite engine may generate a URI from the received object (or from a processed version of the received object), and locate a match of that generated URI with a URI in the information store. The procedure may then continue in a manner similar to that in which the query rewrite engine receives the processed object or its external location from the information store in the context of the query including the subject and predicate of a RDF triple.

To further illustrate exemplary embodiments of the present invention, consider the following seven RDF triples (statements) intended for assertion into the information store (RDF store) 44:

1. assert (uri://xxx, rdf!type, pc!PictureCollection)__URI
2. assert (uri://yyy, rdf!type, pc!Picture)__URI
3. assert (uri://yyy, pc!in Collection, uri://xxx)__URI
4. assert (uri://yyy, pc!takenBy, Bob)__LITERAL
5. assert (uri://yyy, pc!on Date, 12/12/2008)__LITERAL
6. assert (uri://yyy, pc!picture, [4 Mb JPEG FILE])__LITERAL
7. assert (uri://yyy, pc!description, [100 Kb TEXT FILE])__LITERAL The RDF graph of these triples is shown in FIG. 10. According to exemplary embodiments of the present invention, the first three RDF triples (nos. 1, 2 and 3) may be identified as having URI-type objects, and passed into the information store 44. The remaining four triples (nos. 4, 5, 6 and 7), on the other hand, may be identified as having literal-type objects, and diverted to the literal processing 46 for semantic marking and/or processing of the respective objects.

Turning to the sixth RDF triple (no. 6), having identified the triple as including a literal-type object, the URI/literal evaluator 42 may divert the triple to the literal processing element 46, the object type inference engine 48 of which may be configured to identify the object as being a JPEG media object (having known magic number 0xFFD8), and note its size as being 4 Mb. Further, if so desired, the object type inference engine may perform one or more additional checks to ensure the accuracy of the subtype and size identifications.

The object type inference engine 48 may pass the subject (uri://yyy) and predicate (pc!picture) of the RDF triple, and the identified subtype (JPEG) and size (4 MB), to the triple rewriting engine 52; and pass the object (JPEG file) to the object storage engine 50 for processing the object. As or after the object storage engine processes the object, the triple rewriting engine may begin semantically marking the RDF triple by generating corresponding RDF triple(s) based on the subject, predicate, subtype and size. Given the above subject and predicate, for example, the triple rewriting engine 52 may generate a new URI with an internal designation (e.g., internal ns and unique identifier), which may then function as the subject of RDF triples including, as objects, the identified subtype and size of the JPEG media object, as well as the processed JPEG media object or external storage location of the original or processed JPEG media object. The new URI and the corresponding triples in this example may be as follows:

u:=new URI (e.g., ns!zzz)

assert (uri://yyy, pc!picture, u)_URI assert (u, ns!type, JPEG)_LITERAL assert (u,ns!size, 4 Mb)_LITERAL Before, as or after the triple rewriting engine 52 generates the aforementioned corresponding RDF triples, the object storage engine 50 may store or otherwise archive the JPEG media object in an external storage 54, and pass the storage location of the respective object to the triple rewriting engine. The triple rewriting engine, in turn, may generate a further corresponding RDF triple including the location of the JPEG media object, which in this example, may be as follows:

assert (u, ns!location, nota://pictureServer/784598245)_LITERAL where "nota" refers to the Network on Terminal Architecture (also NoTA). The corresponding RDF triples may then be passed to the information store 44 for storage therein, the corresponding RDF triples being stored in the information store in lieu of the RDF triple to which those triples correspond. The RDF graph of the aforementioned seven triples including the corresponding RDF triples in lieu of the original sixth triple is shown in FIG. 11 (compare FIGS. 10 and 11).

The fourth, fifth and seventh triples (nos. 4, 5 and 7) may be processed in a manner similar to that of the sixth triple (no. 6), with the subtypes of the literal-type objects being identified as string, date/time and text media object, respectively. In these instances, however, since the aforementioned subtypes are generally lower in size, the object storage engine 50 may be configured to pass the respective objects to the triple rewriting engine without processing or archiving the objects. This processing and passing of the processed object may be performed in instances in which the size of the object is below a particular threshold that can be easily stored in the information store 44, or in instances in which archiving the object in an external storage 54 may undesirably increase overhead of queries, assertions or the like.

To illustrate the querying capabilities of exemplary embodiments of the present invention, consider the following WQL (Wilbur Query Language) query identifying a particular subject and predicate:

query ("uri://yyy," "(:seq pc!picture)")

Continuing the above example, the information store may return the URI with internal designation generated during semantic marking, namely URI: ns!zzz. The query engine 72 may recognize the URI as having been generated for a processed literal-type object, and pass the URI to the query rewrite engine 74 in another query. The query rewrite engine may receive the query including the URI, and itself query the information store for triples including the respective URI as its subject. These triples, as indicated above, include the following external storage location of the processed object (or original object):

(u, ns!location, nota://pictureServer/784598245)_LITERAL

The query rewrite engine in this instance may query the external storage 54 for the processed object at its respective location, and in response to receiving the processed object from the external storage, may retrieve the original object from the processed object (if processed) and return it to the query engine. The query engine may then return the original object in response to the query.

As explained above, the object type inference engine 48 may be configured to receive the RDF triple with a literal-type object, and identify a subtype of the respective object for semantically marking the object and, if so desired, for processing that object. As also explained above, however, the object type inference engine may also be configured to identify one or more other properties of the literal-type object, such as its size (e.g., bytes). In addition to or in lieu of an object's size, and particular to the context of an image media object, these other properties may include, for example, exchangeable image file format (Exif) information, comments, resolution or the like. In this regard, the other properties may be derivable directly from the object, or from information embedded or otherwise encoded within the object, such as in meta-data.

As also explained above, the RDF store management system 40 of exemplary embodiments of the present invention may be implemented by any one or more of a terminal 10, computing system 22 or server 24, alone or in communication with one another. To further illustrate exemplary embodiments of the present invention, consider an instance in which the RDF store management system is embodied at a computing system or server, and interacts with a terminal to carry out one or more functions of the RDF store management system, as shown in the functional block diagram of FIG. 12 (in the context of the network architecture of FIG. 1 with various other network entities omitted for clarity). Further consider an exemplary instance in which a terminal user wants to offload a number of media objects (e.g., images, music tracks, video tracks, etc.) from their terminal to a network service supported by the computing system/server implementing the RDF store management system.

In the aforementioned exemplary scenario, the user may operate their terminal 10 select a media object to be offloaded to the service. The selected media object may then be sent from the terminal to the computing system 22/server 24 implementing the RDF store management system 40. The media object may be sent in any of a number of different manners or formats. For example, the media object may be sent in the format of an RDF triple, which may be received by the RDF store management system. Alternatively, for example, the media object may be sent in the form of a binary large object (blob) including metadata attached to the object (e.g., Exchangeable image file format—EXIF—metadata) and/or derived from the object, which the service (or more particularly the computing system/server of the service) may first interpret into an RDF triple for receipt by the RDF store management system.

In a manner similar to that explained above with respect to FIG. 7, then, the RDF store management system 40 may be configured to receive and process the asserted RDF triple including the media object. In this regard, in addition to or in lieu of storing the generated RDF triples corresponding to the received RDF triple in a local information store 44, the RDF store management system may be configured to pass the generated RDF triples back to the terminal for receipt by an information store of the terminal. In such instances, the terminal may be configured to implement portions of the RDF store management system with respect to receiving and processing queries, and may do so based on the local information store at the terminal. Alternatively, the portions of the RDF store management system with respect to receiving and processing queries may also be implemented at the computing system 22/server 24. Regardless, as the media object may be accordingly stored in an information store (e.g., in a processed form) or external location, the user may delete from memory of the terminal any copy of the media object remaining therein (outside of the information store in a processed form).

According to one aspect of the present invention, the functions performed by one or more of the entities of the system, such as the terminal 10, computing system 22 and/or server 24, may be performed by various means, such as hardware and/or firmware, including those described above, alone and/or under control of computer-readable program code portions, such as a series of computer instructions. These computer-readable program code portions for performing one or more functions of embodiments of the present invention may form part of a computer program product that also includes a computer-readable storage medium within which the computer-readable program code portions may be embodied.

In this regard, FIGS. 5, 6, 7 and 9 are functional block diagrams and a flowchart of methods, systems and program products according to the invention. It will be understood that each block or step of the block diagrams and flowchart, and combinations of blocks or steps in the diagrams and flowchart, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the diagrams' and flowchart's block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the diagrams' and flowchart's block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the diagrams' and flowchart's block(s) or step(s).

Accordingly, blocks or steps of the diagrams and flowchart support combinations of means for performing the specified functions, combinations of steps for performing the specified functions and program instruction means for performing the specified functions. It will also be understood that one or more blocks or steps of the diagrams and flowchart, and combinations of blocks or steps in the diagrams and flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code for one or more programs,
the at least one memory and the computer program code configured to, with the at least one processor, cause the apparatus to perform at least the following,
receive a first resource description format (RDF) triple for storage in an RDF store, the first RDF triple including a subject, predicate and object, the object comprising a uniform resource identifier-type (URI-type) or a literal-type object, wherein, for the first RDF triple including a literal-type object, the processor is configured to:
identify a subtype of the object of the first RDF triple;
semantically mark the object with the identified subtype, including being configured to generate a plurality of second RDF triples corresponding to the first RDF triple, the plurality of second RDF triples comprising an RDF triple including the subject and predicate of the first RDF triple as the subject and predicate thereof, and another RDF triple including the object of the first RDF triple or a representation of the object of the first RDF triple as the object thereof; and
determine to store the plurality of second RDF triples in the RDF store.

2. An apparatus according to claim 1, wherein the apparatus is further caused to:
process the object of the first triple, including being configured to cause the processor to one or more of compress, reformat or encrypt the object, the representation of the object comprising the processed object or a representation thereof.

3. An apparatus according to claim 2, wherein the processing of the object further includes archiving the processed object at a location in storage external to the RDF store, the representation of the processed object comprising the storage location.

4. An apparatus according to claim 1, wherein the apparatus is further caused to process the object of the first triple, including archiving the object at a location in storage external to the RDF store, the representation of the object of the first triple comprising the storage location.

5. An apparatus according to claim 1, wherein the apparatus is further caused to:
identify a subtype, including identifying one or more other properties of the literal-type object, and
semantically mark the object, including semantically marking the object further with the identified one or more other properties, and
generate, for each of the identified one or more other properties, an additional triple including the respective other property as the object thereof.

6. An apparatus according to claim 1, wherein the apparatus is further caused to determine to store the second and third triples, including store the second and third triples in lieu of storing the first triple in the RDF store.

7. An apparatus comprising:
a user interface;
a communication interface;
at least one processor; and
at least one memory including computer program code for one or more programs,
the at least one memory and the computer program code configured to, with the at least one processor, cause the apparatus to perform at least the following,
receive, through the user interface, an instruction to process an object located in the apparatus;
generate a first triple including a subject, a predicate and the object;
send, through the communication interface, the first triple to a remote apparatus;
receive, through the communication interface, a representation of the object, wherein the representation of the object comprises a storage location;
semantically mark the object, including causing the processor to generate:
a second triple including the subject and predicate of the first triple as the subject and predicate thereof, and
a third triple including the object of the first triple or a representation of the object of the first triple as the object thereof; and
determine to store the second and third triples in a triple store.

8. An apparatus according to claim 7, wherein the apparatus is further caused to remove the object from the apparatus.

9. A method comprising:
receiving a first triple including a subject, predicate and object, the object comprising a literal-type object;
identifying, by a processor, a subtype of the object of the first triple;
semantically marking the object with the identified subtype, semantically marking the object including generating:
a second triple including the subject and predicate of the first triple as the subject and predicate thereof, and
a third triple including the object of the first triple or a representation of the object of the first triple as the object thereof; and
storing the second and third triples in a triple store.

10. A method according to claim 9 further comprising:
processing the object of the first triple, including one or more of compressing, reformatting or encrypting the object, the representation of the object comprising the processed object or a representation thereof.

11. A method according to claim 10, wherein processing the object further comprises archiving the processed object at a location in storage external to the triple store, the representation of the processed object comprising the storage location.

12. A method according to claim 9 further comprising:
processing the object of the first triple, including archiving the object at a location in storage external to the triple store, the representation of the object of the first triple comprising the storage location.

13. A method according to claim 9, wherein identifying a subtype further comprises identifying one or more other properties of the literal-type object, and
wherein semantically marking the object comprises semantically marking the object further with the identified one or more other properties, and generating, for each of the identified one or more other properties, an additional triple including the respective other property as the object thereof.

14. A method according to claim 9, wherein storing the second and third triples comprises storing the second and third triples in lieu of storing the first triple in the triple store.

15. A non-transitory computer-readable storage medium carrying one or more sequences of one or more instructions which, when executed by one or more processors, cause an apparatus to at least perform the following:
receiving a first triple including a subject, predicate and object, the object comprising a literal-type object;
identifying a subtype of the object of the first triple;
semantically marking the object with the identified subtype, including generating a second triple including the subject and predicate of the first triple as the subject and predicate thereof, and generating a third triple including the object of the first triple or a representation of the object of the first triple as the object thereof; and
determining to store the second and third triples in a triple store.

16. A non-transitory computer-readable storage medium according to claim 15, wherein the apparatus is further caused to perform the following:
processing the object of the first triple, including one or more of compressing, reformatting or encrypting the object, the representation of the object comprising the processed object or a representation thereof.

17. A non-transitory computer-readable storage medium according to claim 15, wherein the processing the object of the first triple includes archiving the object at a location in storage external to the triple store, the representation of the object of the first triple comprising the storage location.

18. A non-transitory computer-readable storage medium according to claim 15,
wherein the identifying a sub-type of the object of the first triple includes identifying one or more other properties of the literal-type object, and
wherein the semantically marking the object with the identified subtype comprises semantically marking the object with the identified one or more other properties, and generating, for each of the identified one or more other properties, an additional triple including the respective other property as the object thereof.

* * * * *